(12) United States Patent
Lloyd et al.

(10) Patent No.: US 11,461,492 B1
(45) Date of Patent: Oct. 4, 2022

(54) DATABASE SYSTEM WITH DATA SECURITY EMPLOYING KNOWLEDGE PARTITIONING

(71) Applicant: Infosum Limited, Basingstoke (GB)

(72) Inventors: Richard Lloyd, Buckhurst Hill (GB); Riki Dolby, Hook (GB); Nicholas Halstead, Hook (GB); Alistair Bastian, Ash (GB); Stephen Rowles, Basingstoke (GB); Ben Atkinson, Basingstoke (GB); Jason Tye, Godalming (GB); Hedayat Khezri, Birmingham (GB)

(73) Assignee: INFOSUM LIMITED, Basingstoke (GB)

(*) Notice: Subject to any disclaimer, the term of this patent is extended or adjusted under 35 U.S.C. 154(b) by 0 days.

(21) Appl. No.: 17/502,357

(22) Filed: Oct. 15, 2021

(51) Int. Cl.
G06F 16/20 (2019.01)
G06F 21/62 (2013.01)
G06F 16/28 (2019.01)
G06F 16/2453 (2019.01)
G06F 16/2455 (2019.01)

(52) U.S. Cl.
CPC .... G06F 21/6227 (2013.01); G06F 16/24545 (2019.01); G06F 16/24558 (2019.01); G06F 16/285 (2019.01)

(58) Field of Classification Search
None
See application file for complete search history.

(56) References Cited

U.S. PATENT DOCUMENTS

| 7,698,261 | B1* | 4/2010 | Khoshnevisan | G06F 16/35 |
| | | | | 707/999.003 |
| 10,515,106 | B1 | 12/2019 | Halstead et al. | |
| 10,572,556 | B2* | 2/2020 | Reznik | G06F 16/9535 |
| 11,314,743 | B1* | 4/2022 | Baptist | G06F 16/2456 |
| 2005/0144162 | A1* | 6/2005 | Liang | G06F 16/338 |
| 2008/0270339 | A1* | 10/2008 | Copeland | G06F 16/24573 |
| | | | | 706/50 |
| 2017/0070523 | A1* | 3/2017 | Bailey | G06F 21/32 |
| 2017/0124094 | A1* | 5/2017 | Langseth | G06F 16/2423 |
| 2018/0157761 | A1 | 6/2018 | Halstead et al. | |
| 2019/0340260 | A1* | 11/2019 | Eberlein | G06F 16/278 |
| 2020/0192897 | A1 | 6/2020 | Halstead et al. | |
| 2020/0242110 | A1 | 7/2020 | Halstead et al. | |
| 2020/0250164 | A1 | 8/2020 | Halstead et al. | |
| 2020/0278977 | A1 | 9/2020 | Halstead et al. | |
| 2020/0342169 | A1* | 10/2020 | Shimizu | G06V 10/225 |
| 2021/0209097 | A1 | 7/2021 | Halstead et al. | |

* cited by examiner

Primary Examiner — Jau Shya Meng
(74) Attorney, Agent, or Firm — BainwoodHuang

(57) ABSTRACT

Methods and devices for controlling access to sensitive data stored in a computer system are provided. For at least some data entries in a dataset, each identified by a respective key, an indicator of which zero or more conditions of a plurality of queries are satisfied by that data entry is generated. The keys are grouped into cohorts based on the indicators, at least some of the cohorts comprising keys identifying data entries satisfying the same zero of more conditions. A first output is transmitted to the first computing device comprising an identifier of a first cohort and an indication of a condition which is satisfied by data entries identified by keys in the first cohort. A second output is transmitted to a second computing device comprising an identifier of the first cohort and a set of keys corresponding to the data entries in the first cohort.

19 Claims, 8 Drawing Sheets

| k1 | Q1 | Q2 | Q3 |
|----|----|----|----|
| ka | 1 | 1 | 1 |
| kb | 1 | 1 | 1 |
| kc | 0 | 0 | 0 |
| kd | 0 | 0 | 0 |
| ke | 1 | 0 | 1 |
| kf | 1 | 0 | 1 |

Figure 5a

| k1 | Q1 | Q2 | Q3 | |
|----|----|----|----|----|
| ka | 1 | 1 | 1 | C1 |
| kb | 1 | 1 | 1 | |
| kc | 0 | 0 | 0 | C2 |
| kd | 0 | 0 | 0 | |
| ke | 1 | 0 | 1 | C3 |
| kf | 1 | 0 | 1 | |

Figure 5b

DATABASE SYSTEM WITH DATA SECURITY EMPLOYING KNOWLEDGE PARTITIONING

TECHNICAL FIELD

The present disclosure relates to controlling access to sensitive data stored in a computer system.

BACKGROUND

It has long been the case that it has been possible to query databases holding data to provide a response to the query. Queries are run on databases to find a match for the information being requested responsive to the query. For example, an entity (e.g. a user) providing the query might want to know how many entries in a particular database satisfy a particular requirement, for example, an age range or gender requirement. There are numerous technologies available to handle this.

Once a query has been run to generate a set of entries satisfying that query, it may be desirable to perform some further action in relation to one or more of the entries in that set. However, issues can arise when the database is managed by a different entity (a "managing entity") from the entity providing the queries (the "querying entity"). This is because, for example, the information in the database may be private or proprietary information of the managing user and/or the form of the query may be private or proprietary information of the querying user. In the prior art, for the managing entity and querying entity to cooperate on a further action to be taken, either the querying entity needs to be provided with information relating to the entries in the database which satisfy the query, the managing entity needs to be provided with the query itself, or both.

SUMMARY

According to a first aspect disclosed herein, there is provided a method of controlling access to sensitive data stored in a computer system, the method comprising:

receiving at a central controller a plurality of queries from at least one first computing device, each query indicating one or more conditions;

accessing a dataset comprising a plurality of data entries each identified by a respective one or more keys;

generating for at least some of the data entries in the dataset, a respective indicator of which zero or more of the conditions of the plurality of queries are satisfied by that respective data entry;

storing in computer memory an indication of keys identifying the data entries grouped into one or more cohorts based on the indicators, each cohort stored in association with a respective cohort identifier, at least some of the cohorts comprising keys identifying data entries satisfying the same zero or more of said conditions;

generating a first output comprising an identifier of a first cohort and an indication of at least one of said plurality of conditions which is satisfied by data entries identified by keys in the first cohort;

transmitting the first output to the first computing device;

generating a second output comprising an identifier of the first cohort and a set of keys corresponding to the data entries in the first cohort; and transmitting the second output to a second computing device, the second computing device separate from the first computing device.

In an example, the first output is not transmitted to the second computing device and/or the second output is not transmitted to the first computing device.

In an example, storing keys identifying the data entries grouped into one or more cohorts comprises assigning every key in the dataset a cohort identifier. An advantage of this is that the second computing device is prevented from inferring which keys are of interest to the first computing device (as defined by the queries).

In an example, the first and second computing devices are owned by different entities.

In an example, the plurality of queries are received from two or more different first computing devices, and wherein a respective first output is generated for each first computing device, the indication in each respective first output relating only to conditions of queries received from that respective first computing device. In such cases, the two or more different first computing devices may still receive a complete set of cohort identifiers. It is just the query information which differs.

In an example, the method comprises partitioning the data entries into disjunct sets, each disjunct set comprising data entries which satisfy the same zero or more of said plurality of queries; and wherein storing keys identifying the data entries grouped into one or more cohorts comprises splitting a disjunct set comprising more than a threshold number of keys into two or more cohorts.

In an example, the method comprises partitioning the data entries into disjunct sets, each disjunct set comprising data entries which satisfy the same zero or more of said plurality of queries; and wherein storing keys identifying the data entries grouped into one or more cohorts comprises combining a disjunct set comprising fewer than a threshold number of keys with another of the disjunct sets.

In an example, generating for each data entry in the dataset, the indicator of which zero or more of the conditions of the plurality of queries are satisfied by that data entry comprises accessing an additional dataset storing associations between keys of the first type and keys of the second type. Such an additional dataset may be referred to as a "via" dataset.

In an example, generating for each data entry in the dataset, the indicator of which zero or more of the conditions of the plurality of queries are satisfied by that data entry comprises accessing an additional dataset storing attribute information for data entries of the dataset. Such an additional dataset may be referred to as an "enrichment" dataset In an example, the generating and storing of the data entries grouped into at least one cohort are performed periodically, e.g. every twenty-four hours, once a week, etc.

In an example, the generating and storing of the data entries grouped into at least one cohort are performed in response to receiving one or more new queries from one or more of the first computing devices.

In an example, the generating and storing of the data entries grouped into at least one cohort are performed in response to input received from the second computing device.

In an example, the method comprises discarding one or more of the queries, and wherein said generating of the indicators is performed based on remaining queries following said discarding.

In an example, said generating and storing of the data entries grouped into at least one cohort are performed in response to input received from the second computing device.

In an example, the method comprises generating for each query a respective segment comprising any of said keys which satisfy that query; storing the segments in computer memory; and wherein said generating of the indicators comprises accessing the stored segments.

In an example, the segments are stored in computer memory as respective binary structures, the binary structure for a given segment being generated by encoding keys comprised in that segment. The binary structures may be selected from bloom filters, cuckoo filters, and counting filters.

In an example, the segments are stored in computer memory as a list of keys annotated with segment identifiers.

In an example, the method comprises storing keys identifying the data entries grouped into one or more cohorts comprises sorting the keys based on their respective identifiers and generating cohorts based on the sorted keys.

In an example, the method comprises adding to at least one cohort at least one key having an indicator different from those of other keys in that cohort. In other words, one or more cohorts may be intentionally "poisoned". This helps prevent the second computing device from determining precisely which keys in that cohort have a property in common.

In an example, the dataset holds at least some of the data entries in association with keys of a first key type and keys of a second key type different from the first. The respective indicators may be generated using the first key type and optionally also the second key type, and the cohorts may be stored using the second key type and optionally also the first key type. Similarly, the set of keys in the second output may comprise keys of the second key type and optionally also the first key type.

According to a second aspect disclosed herein, there is provided a computing device for controlling access to sensitive data stored in a computer system, the computing device comprising:
  a computer memory;
  an interface for receiving a plurality of queries from at least one first computing device, each query indicating one or more conditions;
  a cohort generation module configured to:
  accessing a dataset comprising a plurality of data entries each identified by one or more respective keys;
  generate, for at least some of the data entries in the dataset, a respective indicator of which zero or more of the conditions of the plurality of queries received via the input are satisfied by that respective data entry; and
  store in the computer memory an indication of keys identifying the data entries grouped into one or more cohorts based on the indicators, each cohort stored in association with a respective cohort identifier, at least some of the cohorts comprising keys identifying data entries satisfying the same zero or more of said conditions; and
  an output generation module configured to:
  generate a first output comprising an identifier of a first cohort and an indication of at least one of said plurality of conditions which is satisfied by data entries identified by keys in the first cohort;
  transmit the first output to the first computing device;
  generate a second output comprising an identifier of the first cohort and a set of keys corresponding to the data entries in the first cohort; and
  transmit the second output to a second computing device, the second computing device separate from the first computing device.

BRIEF DESCRIPTION OF THE DRAWINGS

To assist understanding of the present disclosure and to show how embodiments may be put into effect, reference is made by way of example to the accompanying drawings in which:

FIG. 5a shows schematically an example of indicators for keys in a database;

FIG. 5b shows schematically an example of cohorts for keys in a database;

DETAILED DESCRIPTION

The present disclosure relates to techniques for partitioning knowledge between at least two entities in a computer system. As described later below, data entries are grouped into one or more "cohorts" based on one or more respective criteria. This is done in such a manner that knowledge for each cohort is fragmented into two parts regarding:
  a) the criteria by which data entries were chosen for membership of a particular cohort; and
  b) which specific data entries are members of a particular cohort.

Only fragment "a" is sent to a first entity and only fragment "b" is sent to a second entity. That is, neither entity is sent the full knowledge ("a" AND "b"). An identifier of a cohort ("cohort ID") can be used as a "go-between" allowing the entities to e.g. specify further action that one or more of the entities should take. For example, the first entity may wish for the second entity to perform some further processing on data entries satisfying particular criteria (are in a particular cohort). The first entity can request this, and the second entity can service the request, using a cohort ID. This means that i) the first entity does not know which specific data entries are being processed, and ii) the second entity does not know the criteria that led to the selecting of those specific data entries by the first entity. These restrictions on access to information are advantageous in that the information may be sensitive to each party (e.g. the set of data entries being processed may be sensitive to the second entity, and the set of criteria may be sensitive to the first entity). Another advantage is that the processing by the second entity is enabled even if there are security restrictions on access to the data entries themselves.

Figure 1:
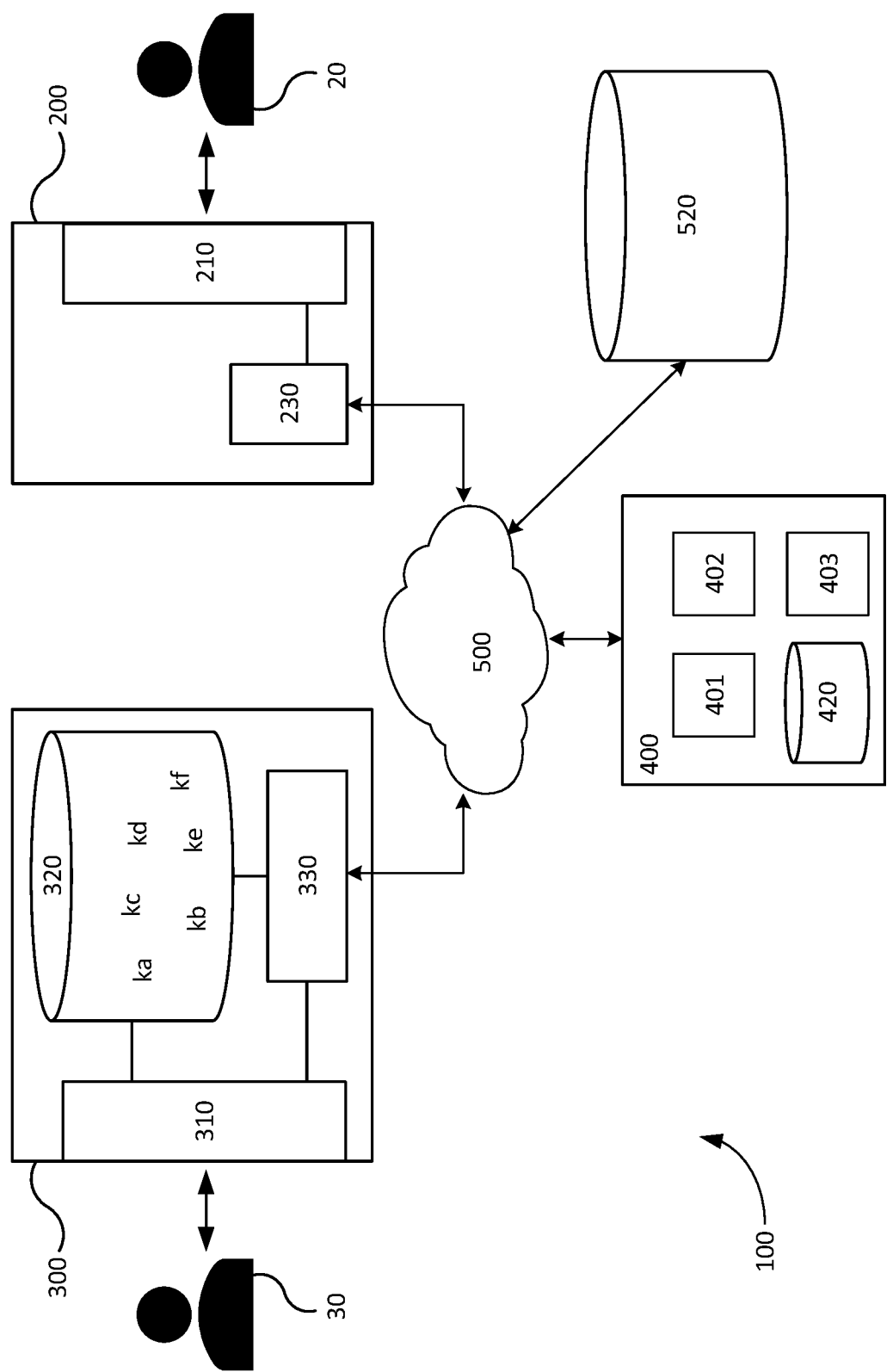
FIG. 1 shows schematically an example of a computer system in accordance with examples described herein.

FIG. 1 shows a computer system 100 comprising a first computing device 200, a second computing device 300, and a central controller 400. The first computing device 200, second computing device 300, and central controller 400 are operatively coupled via a network 500. Specifically, the first computing device 200, second computing device 300, and central controller 400 are able to communicate via the network 400. The network 400 may be, for example, the Internet. It is appreciated that the communication between the first computing device 200, second computing device 300, and central controller 400 may be provided by one or more wired or wireless connections. It is also appreciated that, although not illustrated in FIG. 1, the first computing device 200, second computing device 300, and central controller 400 comprise respective data interfaces for transmitting and/or receiving data.

Also shown in FIG. 1 is a supporting dataset 520, also operatively coupled to the network 500. The term "supporting dataset" is used generally herein to refer to any dataset or part of a dataset which can aid in resolving a query, as will be described in more detail later below. Such a supporting dataset 520 may be stored at the first computing device 200, second computing device 300, central controller 400, or at a different computing device.

The first computing device 200 and second computing device 300 are owned and managed by a first entity 20 and a second entity 30, respectively. The first entity 20 and second entity 30 may be, for example, human users or businesses. In examples, the first entity 20 may be an advertiser and the second entity 30 may be a publisher, with the computer system 100 forming part of a programmatic advertising system. This is described later below.

The central controller 400 may be implemented using one or more processors. The central controller 400 comprises a storage 420 (i.e. a data storage) which may be referred to herein as "central storage 420" to distinguish the storage 420 of the central controller 400 form other storage devices. The central controller 400 may implement a respective "bunker" for one or more of the first computing device 200 and second computing device 300, the bunker storing datasets of the first entity 20 and/or second entity 30 locally at the central controller 300 (e.g. in central storage 420). In such cases, the central controller 400 may, in the manner described herein, act on the local copies of the dataset are stored in the respective bunker(s), rather than acting directly (via the network 500) on data as stored at the computing devices 200, 300.

It is appreciated that the central controller 400 refers to a set of functionalities as described herein, rather than being restricted to a particular physical device. The central controller 400 may be implemented on a single computing device (e.g. processor), or may be implemented in a distributed manner across a plurality of different computing devices. For ease of explanation, the central controller 400 is described as comprising a segment generation module 401, a cohort generation module 402, and an output generation module 403, which are functional modules for providing different respective functionalities as described later below. It will be appreciated that the segment generation module 401, cohort generation module 402, and output generation module 403 may, in practice, be implemented at different computing devices (e.g. on different processors). Conversely, it will also be appreciated that the functionality described herein may be provided by a single functional module which performs the functionality of all three of the segment generation module 401, cohort generation module 402, and output generation module 403.

The first computing device 200 comprises a controller 230 and a user interface 210. The controller 230 comprises a processor for performing the functionality described herein. The first entity 20 interacts with the first computing device 200 via the user interface 210 of the first computing device 200. The user interface 210 may comprise, for example, one or more of a display, a microphone, a computer mouse, a touchscreen, an API, etc.

The second computing device 300 comprises a database 320, a controller 330, and a user interface 310. The controller 330 comprises a processor for performing the functionality described herein. The second entity 30 interacts with the second computing device 300 via the user interface 310 of the second computing device 300. The user interface 310 may comprise, for example, one or more of a display, a microphone, a computer mouse, a touchscreen, an API, etc.

The database 320 at the second computing device 300 stores a set of data entries, each data entry comprising at least one key and optionally one or more attributes.

A key is an identifier of a data entry in a database (e.g. in the case of people or computer devices associated with people, names, telephone numbers, email addresses, etc. In some cases, an entry may be identified for example by an email address, but also include a name. An attribute represents a value of a data entry in a particular category of information (e.g. age, gender, income, health criteria etc.). An attribute may have a value and a category. For example, an attribute may have the category of age and a particular entry in a database may have a value in the age category of 39. Unlike attributes, keys are intended to (but may not always) uniquely identify the entity in the database. In the example of FIG. 1, six keys are shown (ka-kf). Note that the first computing device may be interested in performing actions which require information about the keys of the database 320, but for regulatory or other reasons the first computing device may not be permitted access to the database 320.

As known generally in the art of computer databases, a query or "database query" is a request for particular information from one or more databases. The query defines one or more criteria for use in selecting the information to be returned in response to the query, i.e. the returned information satisfies the query. In the context of the present invention, a query may be run against keys in the database 320 to return a set of keys which satisfy that query. Some types of query do not require attribute information to resolve, e.g. a query may comprise an intersection to be performed between the keys in the database 320 and another set of keys. Other types of query do require attribute information to resolve, e.g. a filter on a particular category of an attribute (such as "age>40"). In such cases, either the necessary attribute information must already be present in the dataset 320 or it must be provided by one or more supporting datasets 520. This is described later below. One or more supporting datasets 520 may also be used in the running of a query which does not require attribute information. This is also described later below.

The set of keys satisfying a particular query may be referred to as a "segment". As described below with reference to FIG. 2, the segment generation module 401 of the central controller 400 generates segments for the keys in the database 320 of the second computing device 300 based on queries received from the first computing device 200. The first computing device 200 may have an interest to know which keys satisfy which segments, but that information is restricted for regulatory or other reasons. Moreover, the queries defined by the first computing device 200 may represent proprietary knowledge, i.e. knowledge of the first entity 20 that the second entity 30 is not permitted to access (e.g. a current customer status, a product purchase history or frequency information, a userbase membership, etc.). To overcome these technical problems, and as described below with reference to FIG. 3, the cohort generation module 402 of the central controller 400 uses some or all of these segments as the basis for "cohort generation".

Figure 2:
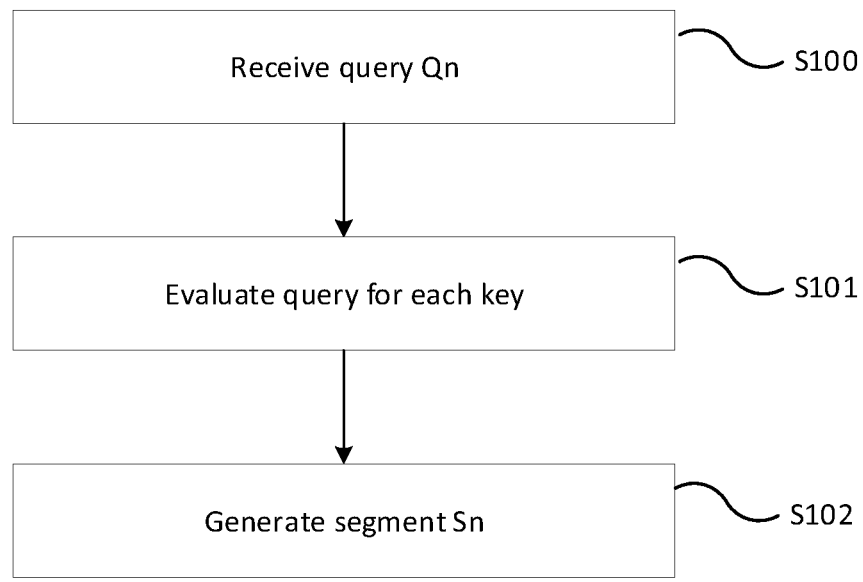
FIG. 2 shows schematically a flow diagram of segment generation in accordance with examples described herein.

FIG. 2 shows schematically a flow diagram of segment generation by the segment generation module 401 of the central controller 400.

At S100, the segment generation module 401 receives a query from the first computing device 200. The query is defined at the first computing device 200 (e.g. by the first entity 20) and represents a desired segment. In some examples, the query may be tagged with metadata (e.g. a campaign ID, or an identifier of the first entity 20).

In general, a query indicates one or more conditions:

A first example of a condition is a "filtering expression". A filtering expression denotes an operation which is carried out on attributes to exclude attributes which do not have values falling into a certain range or above or below a certain limit. For example, a filter expression could be age greater than 40, or salary greater than £10,000.

A second example of a condition is an "aggregation expression". An aggregating expression denotes an operation which combines results of a search across one or more dataset into certain bins or bucket. Each bin or bucket may be one single value or a range of values of the attribute which is being aggregated. An aggregate operation could be a count of entries, a maximum number of entries, an average value or something else. There are many possible aggregation functions which could be used for this purpose. Examples include top-n and count-by-bins aggregations functions.

A third example of a condition is a set operation on keys (e.g. an intersection operation). Such a set operation can define an "intent" for the query. For example, the query may specify a set of keys to be intersected with the keys in the dataset 320 in order to generate the segment. The set of keys may be stored in a supporting dataset 520. As a specific example, first supporting dataset 520 of the first entity 20 (e.g. at the first computing device 200) may comprise a local set of keys (e.g. a list of names in a userbase). In this case, the query could include a condition specifying an intersection with keys from the dataset 320 with the local set of keys in the first supporting dataset 520. An advantage of this is that the results from the query are then limited to only keys which are also represented in the local set of keys, giving the first entity 20 more control over the returned set of keys. This type of condition does not require attribute information to resolve.

A query is satisfied if all of its conditions are met. For example, a query may specify a first condition as "age=20 to 40 years" (a filtering expression) and a second condition as "intersect supporting dataset X". This query would be satisfied by data entries having an age value between 20 to 40 and also being represented by keys in supporting dataset X. Note that supporting dataset X may be stored at any data storage (e.g. at the first computing device 200, the central controller 400, or another data storage).

At S101, the segment generation module 401 evaluates the query for each key in the database 320 of the first computing device 200 to determine a set of the keys which satisfy that query (i.e. a segment). In examples, the segment generation module 401 may act on the database 320 as stored at the second computing device 300 directly (via the network 500). In other examples, the database 320 maybe preloaded into a "bunker" at the central controller 400, i.e. stored to a storage (e.g. central storage 420) at the central controller 400, and the segment generation module 401 may act on the database as stored in the bunker.

Note that the queries Q1-Q3 may be "simple" (requiring just a single condition, e.g. age>40) or "compound" or "complex" (requiring two or more condition, e.g. age>40 AND gender=female). Alternatively, each individual condition may be considered a "query", in which case a single "simple" segment is generated per query (e.g. a first segment Sa for age>40 and a second segment Sb for gender=female). Set operations on these simple segments may be used to generate compound segments (e.g. Sa AND Sb would generate the equivalent segment for the single compound query mentioned above).

As mentioned above, evaluating a query by the segment generation module 401 may or may not involve the use of one or more "supporting datasets" (an example of a supporting dataset 520 is shown in FIG. 1). Various examples will now be described.

Consider first the case in which the dataset 320 does not hold any attributes in association with the keys. In this case, a query not requiring attribute information (e.g. a query specifying a condition "intersect keyset X") may be run on dataset 320 if the keys in keyset X are of the same type as the keys in the dataset 320. However, if keys in keyset X are of a different type (e.g. email addresses) from keys in the dataset 320 (e.g. names), then one or more supporting datasets 520 may enable a key conversion or "mapping" to be carried out to convert between the two key types. The term "via dataset" is used to define a supporting dataset 520 which carries out a key mapping (or "via") function. This is described in the applicant's earlier United States Patent Application with publication number US2021/0209097A1.

It is also possible to use two or more supporting datasets 520 as "via datasets", each providing a different key mapping. These can be "daisy-chained" to allow key conversion through multiple types of keys between two datasets through one or more intermediate datasets, and/or can be used at the same time to provide different key conversions between the same two datasets to provide for successfully conversion of as many keys as possible. This is described in the applicant's earlier United Stated Patent Application with publication number US20200242110A1.

Considering still the case in which the dataset 320 does not hold any attributes in association with the keys, a query requiring attribute information (e.g. a query containing a filtering expression, such as "age>40") cannot be run over dataset 320 directly because the required age information is missing. In such cases, one or more supporting dataset(s) 520 may be used to augment or "enrich" attributes which are missing from the database 320 of the second computing device 300. The term "enrichment dataset" is used to define a supporting dataset 520 which carries out an enrichment function. This is described in the applicant's earlier United States Patent Application with publication number US2021/0209097A1.

It is appreciated that the above example applies also in cases where the dataset 320 does hold some attribute information, but that attribute information in the dataset 320 is of a different type than that required by the query (e.g. the query requires a filter on age values, while the dataset 320 holds salary values only). In such cases, any of the above examples may be used to source the required attribute information (from a supporting dataset 520 which, as mentioned, could be any dataset stored at any location, including at the first the first computing device 200, second computing device 300, central controller 400, or at a different computing device).

It is also possible to use a supporting dataset 520 even if that supporting dataset 520 is subject to security provisions restricting access to the data entries it holds. For example, the intersection between two datasets can be determined without requiring either dataset to disclose any data entries. This is described in the applicant's earlier United Stated Patent Application with publication number US20200250164A1.

If a given query comprises multiple expressions, for example, it is also possible to apply each of the expression to different supporting datasets 520. This is described in the applicant's earlier United Stated Patent Application with publication number US20180157761A1.

In some examples, the segment generation module 401 may provide an indication of the available supporting datasets 520 allowing e.g. a user to select one or more supporting datasets 520 for use in performing the query to generate the segment. This is described in the applicant's earlier United Stated Patent Application with publication number US20200278977A1.

In some examples, the second dataset 320 over which the queries are run may comprise a plurality of component datasets, possibly owned and managed by different entities. It is possible in such cases for the plurality of component datasets to be queried without compromising data security of any of the component datasets. This may be subject to one or more requirement, e.g. that the component datasets share at least one key type. This is described in the applicant's earlier United Stated Patent Application with publication number US20200192897A1.

At S102, the segment generation module 401 generates the segment, which is a set of keys satisfying the query received at S101. The segment data may be stored by the central controller 400 at the central storage 420. The segments are stored in association with a respective segment identifier. In examples, one or more of the segments may be stored along with respective metadata (e.g. a campaign ID, an identifier of the first computing device 200 which provided the query defining that segment, etc.) if present.

The segment generation module 401 may receive a plurality of queries, and may apply steps S100-S102 in relation to each of the queries, to generate a respective plurality of segments. As an example, consider three queries Q1-Q3 run over the six keys ka-kf shown in FIG. 1 to generate three respective segments S1-S3. These three segments may be defined as shown in Table 1.

TABLE 1

| Segment | Keys |
|---------|------|
| S1 | ka, kb, ke, kf |
| S2 | ka, kb |
| S3 | ka, kb, ke, kf |

Note that some keys (kc and kd in this example) may not be members of any segment, as they do not satisfy any of the queries which define the segments.

In examples, the segment generation module 401 may generate a respective binary structure representing each segment, and store the binary structure(s) rather than the set of keys themselves. An example of a binary structure is a bloom filter. To construct a bloom filter for a given segment, the segment generation module 401 applies (the same) n deterministic functions (e.g. hash functions) to each key in the segment to generate n respective location values for each key, and sets all positions within the bloom filter corresponding to those location values to "1" (other positions in the bloom filter remaining "0"). Note that this naturally de-duplicates entries in the segment, as two identical keys would be hashed to the same n location values. The bloom filter for a segment can be used to determine whether a given key is a member of that segment by generating the n hash values for that key and inspecting the resulting n locations in the bloom filter. If any of the locations are "0" then that key is not a member of the segment. If all the locations are "1" then that key might be a member of that segment.

Later, an "activation" process can be applied to convert the binary structure back into a set of keys for each segment using an "activation dataset" (also known in some examples as an "activation bunker"). Hence, the binary structure(s) represent an efficient storage mechanism for the segment definitions. This is described in the applicant's earlier United Stated Patent Application with publication number U.S. Ser. No. 10/515,106.

In the case of a bloom filter, the "activation" process referred to above in this case comprises testing an activation dataset storing keys against the bloom filter to determine for each key in the activation dataset whether or not it is a member of the segment (subject to noise introduced by potential false positives), and outputting the set of keys which may be members of the segment. Preferably, the activation dataset used in the activation process is one likely to contain keys matching those used to create the bloom filter in the first place. Hence, in some examples, the activation dataset may be a dataset of the first computing device 200. The activation dataset(s) for the first computing device 200 may be stored at a respective bunker of the first computing device 200 at the central controller 400. One or more activation dataset(s) for the second computing device 300 may also be stored at a respective bunker of the second computing device 300 at the central controller 400.

A particular bloom filter can be "activated" with respect to different output key types. For example, the bloom filter may be activated using a first activation dataset which outputs keys of a first type and also activated using a second activation dataset which outputs keys of a second type. This means that the cohort generation module 402, described below, does not need to act on keys of the same type which were used in the segment definitions by the segment generation module 401.

Other examples of binary structures are counting bloom filters and cuckoo filters. Generally, any binary structure which allows for membership lookups may be used.

Another option for storing the segment information is to store a list of keys annotated with identifiers of the segments to which they belong. The list may also comprise the full list of keys (not annotated). In particular, the list is a data structure comprising key-segmentID (or queryID) pairs, each pair representing that that key is a member of that segment (satisfies that query). To use the example of Table 1, such a list may comprise the following entries:

ka
kb
kc
kd
ke
kf
ka-S1
kb-S1
ke-S1
kf-S1
ka-S2
kb-S2
ka-S3
kb-S3 ke-S3
kf-S3

The list can be sorted based on the keys (e.g. lexicographically using an efficient sorting algorithm), which has the effect of grouping the keys. An advantage of this is that boundaries between groups of segments are easy to identify (as points where the key changes). To continue the example above, the sorted list may comprise:

ka
ka-S1
ka-S2
ka-S3
kb
kb-S1
kb-S2
kb-S3
kc
kd
ke
ke-S1
ke-S3
kf
kf-S1
kf-S3

For example, it can easily be determined from the list that keys kc and kd are not members of any segment (as there are no annotated copies of these keys), and it can easily be determined from the list that keys ke and kf are members of segments S1 and S3.

However the segment information is stored, the keys have at this point been grouped into segments based on them sharing one or more characteristics (satisfying the same query).

The segments can be useful, but they give away from information to each of the first entity 20 and second entity 30 than desirable. Specifically, the first entity 20 can see the keys which are members of each segment, and the second entity 30 may be able to assess the keys in a given segment to "reverse-engineer" the query provided by the first entity 20. The second entity 30 is also able to see which keys are not members of any segment (kc and kd in this example). To address this, the concept of a cohort is introduced, which will now be described.

Figure 3:
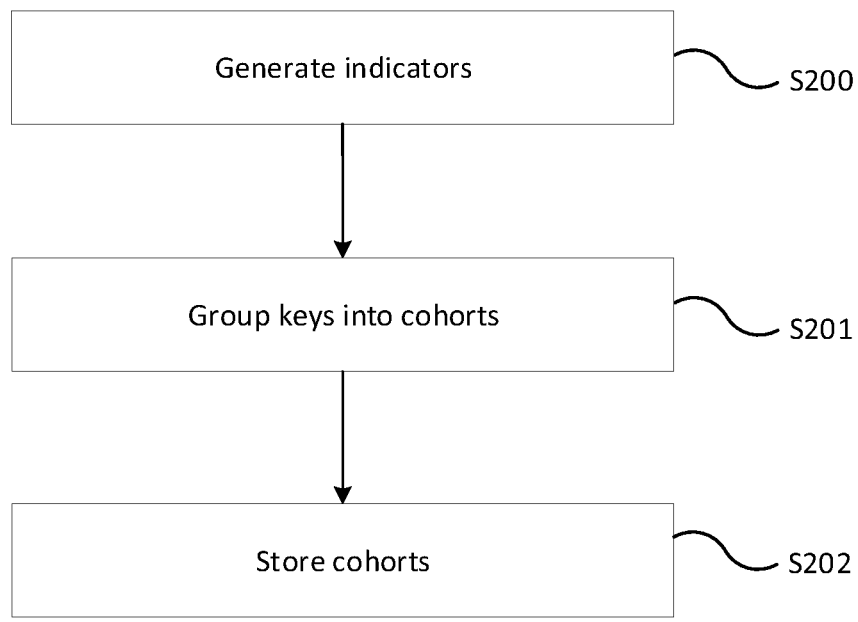
FIG. 3 shows schematically a flow diagram of cohort generation in accordance with examples described herein.

FIG. 3 shows schematically a flow diagram of cohort generation by the cohort generation module 402 of the central controller 400.

At S200, the cohort generation module 402 uses the segment information to generate, for each key in the database 320, an indicator of which of the plurality of queries are satisfied by that key. If the segment definitions are stored as binary structures, this may comprise first converting the segments back into sets of keys using an activation process as described above. If the segment definitions are stored as a sorted annotated list of keys, the indicator for a given key can be generated by identifying a portion of the list prefixed by that key and generating the indictor based on the annotations present in that portion (which indicate the segments of which they key is a member).

In some examples, the cohort generation module 402 may discard one or more of the segments before generating the indicators. For example, the cohort generation module 402 may provide a set of segment identifiers (S1-S3), along with any associated metadata, to the second computing device 300 for use in selecting one or more of the segments to discard. The selection at the second computing device 300 may be done automatically by the second computing device or in response to user input (from the second entity 30), e.g. based on the metadata of that segment.

The indicator for a given key indicates the (non-discarded) segments to which that key belongs. For example, the indicator for a given key may be a bit sequence consisting of an ordered n-tuple of binary values (one per query/segment), each binary value relating to a different one of the queries and indicating whether or not that query is satisfied by that key (whether that key is a member of the corresponding segment). This is shown schematically in FIG. 5a. Note that this is a different representation of the same information shown in Table 1 earlier. In this example, each row represents a different key, and each column represents a different query (segment).

In this example, the indicator for a given key comprises a binary value representing whether or not each query Q1-Q3 is satisfied by that key. Note that the example of FIG. 5a follows the earlier example of the segments S1-S3: in this example, entries ka and kb each satisfy Q1, Q2 and Q3, entries kc and kd satisfy none of the queries Q1-Q3, and entries ke and kf satisfy Q1 and Q3 but not Q2. Hence: the indicator for key ka has a bit sequence 1-1-1, indicating that it is in segment S1, segment S2, and segment S3; the indicator for key kb has a bit sequence 1-1-1, indicating that it is in segment S1, segment S2, and segment S3; the indicator for key kc has a bit sequence 0-0-0, indicating that it is not in any of the segments S1-S3; the indicator for key kd has a bit sequence 0-0-0, indicating that it is not in any of the segments S1-S3; the indicator for key ke has a bit sequence 1-0-1, indicating that it is in segment S1 and segment S3, but not segment S2; and the indicator for key kf has a bit sequence 1-0-1, indicating that it is in segment S1 and segment S3, but not segment S2. Together, the indicators for all the keys form an array of bits (a 6×3 array in this case) encoding the information regarding which keys satisfy which queries Q. The cohort generation module 402 may store this array of bits as a bitmap in the central storage 420 at the central controller 400.

At S201, the cohort generation module 402 groups the keys into one or more cohorts C based on the indicators. The cohort generation module 402 may store the cohorts C in the central storage 420 in association with the respective cohort identifier. A primary aim of cohort generation is to conceal a link between particular keys and the segment to which they belong. To that end, the concept underlying cohort generation is that all keys are placed in a cohort (unlike segments, where one or more keys may not be a member of any of the segments). The cohort is identified by a cohort identifier. The cohort identifier by itself does not associate the cohort explicitly with any segments. Note that for practical purposes there may not be a one-to-one relationship between cohort entries and a particular segment membership, as described later.

There are many ways in which the cohorts C can be generated. In general, however, at least some of the cohorts C comprise keys satisfying the same zero or more queries Q (being members of the same zero or more segments). This might not be true of all cohorts. A key satisfying zero queries means that the queries were run against that key, but that key did not satisfy any of those queries. This is the case, in this example, for keys kc and kd.

A simple example is shown in FIG. 5b, which follows on from the example of FIG. 5a. Specifically, in this example, entry ka and entry kb are grouped into a first cohort C1, entry kc and kd are grouped into a second cohort C2, and entry ke and entry kf are grouped into a third cohort C3. It is appreciated that this is just one example of cohort generation. Further, more complex, examples are described later below.

At S202 the cohort generation module 402 stores the cohorts in the central storage 420. The cohorts may be represented in a data structure indicating, for each cohort, which keys are members of that cohort and which segments belong to that cohort. An example is shown in Table 2.

TABLE 2

| Cohort ID | Keys | Segments |
| --- | --- | --- |
| C1 | ka, kb | S1, S2, S3 |
| C2 | kc, kd | [none] |
| C3 | ke, kf | S1, S3 |

It is appreciated that this is a just an example of such a data structure representing the generated cohorts. Alternatively, the data structure may comprise one entry per key, and indicate for each key its respective cohort ID and segment information.

In any event, the data structure stored by the cohort generation module 402 in central storage 420 is the "complete" information regarding the cohorts (both key membership information and segment information). While the key membership information and segment information are stored together in this data structure, as can be seen in Table 2, it is now possible to separate them from one another. As will now be described, this allows the output generation module 403 to generate separate outputs containing different fragments of the information.

Figure 4:
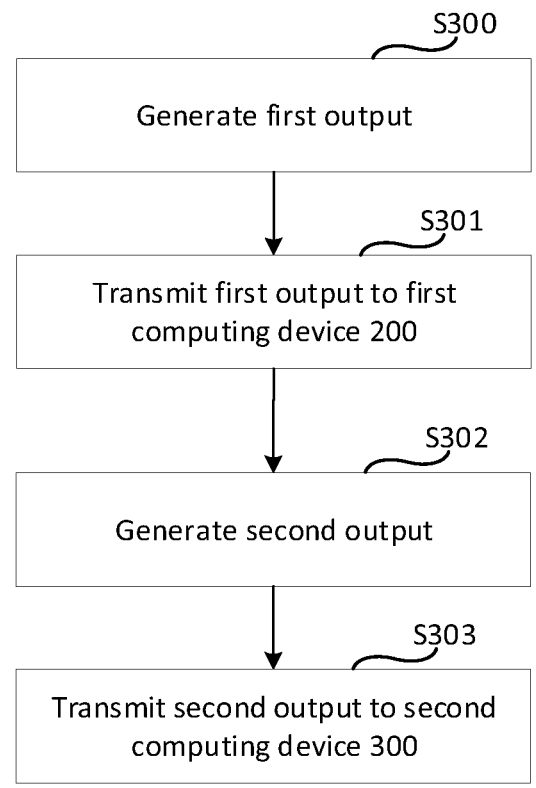
FIG. 4 shows schematically a flow diagram of output generation in accordance with examples described herein.

FIG. 4 shows schematically a flow diagram of output generation by the output generation module 403 of the central controller 400.

At S300, the output generation module 403 generates a first output using the data structure stored at S202 representing the cohorts which were generated by the cohort generation module 402. Specifically, the output generation module 403 generates a new data structure (the first output) by removing information relating to the keys (the second column in Table 2, in the above example).

Following the above example, the first output may comprise a data structure as shown in Table 3.

TABLE 3

| Cohort ID | Segments |
| --- | --- |
| C1 | S1, S2, S3 |
| C2 | [none] |
| C3 | S1, S3 |

Hence, the first output comprises an identifier of at least one cohort and an indication of the segment(s) represented in that cohort (i.e. which of the plurality of queries is/are satisfied by keys in that cohort). The first output does not comprise an indication of the keys in the cohorts. As is the case in this example, one or more of the cohorts may comprise keys not satisfying any of the queries.

At S301, the output generation module 403 transmits the first output to the first computing device 200. The first computing device 200 may store the first output in a local memory (not shown in the figures). Any cohorts comprising only keys not satisfying any of the queries (like cohort C2 above) may or may not be sent to the first computing device 200. It may be preferable to include such cohorts in the first output to maintain integrity in the addressable cohort ID space (e.g. the second computing device 300 cannot randomly create cohort IDs).

At S302, the output generation module 403 generates a second output using the data structure stored at S202 representing the cohorts which were generated by the cohort generation module 402. Specifically, the output generation module 403 generates a new data structure (the second output) by removing information relating to the segments (the third column in Table 2, in the above example). In examples, Step S302 may be performed in parallel with step S300.

Following the above example, the second output may comprise a data structure as shown in Table 4.

TABLE 4

| Cohort ID | Keys |
| --- | --- |
| C1 | ka, kb |
| C2 | kc, kd |
| C3 | ke, kf |

Hence, the second output comprises an identifier of a cohort and a set of keys in that cohort. The second output does not comprise an indication of the queries satisfied by the data entries identified by those keys.

At S303, the output generation module 403 transmits the second output to the second computing device 300. In examples, Step S303 may be performed in parallel with step S301.

Put differently, the second computing device 300 receives a cohort ID for each key in its database 320. Following the same example, the second computing device 300 may store the associations between keys and cohort IDs shown in Table 5 (e.g. in a local storage, which may or may not be separate from the database 320). The second computing device 300 does not know which cohorts are associated with which segments—that information has been given only to the first computing device 200. In this way, knowledge is partitioned between the first and second computing devices.

TABLE 5

| Key | Cohort ID |
| --- | --- |
| ka | C1 |
| kb | C1 |
| kc | C2 |
| kd | C2 |
| ke | C3 |
| kf | C3 |

The queries provided by the first computing device 200 may implicitly indicate desirable attributes for keys (e.g. which sorts of data entries the first entity 20 is interested in). In examples, the ability of the second computing device 300 to infer this is prevented by the cohort generation module 402 assigning a cohort ID to every key in the dataset 320 even if, for example, one or more keys did not satisfy any of the queries (those keys would still be assigned a cohort ID).

As explained above, the first output and the second output are transmitted to different entities (the first computing device 200 and second computing device 300, respectively). This makes it impossible or at least more difficult for either computing device 200, 300 to gain access to the full knowledge of the cohorts. In examples, one or more steps may be taken to ensure that the first computing device 200 cannot gain access to the information in the second output, and vice-versa for the second computing device 300. In particular, the first computing device 200 and second computing device 300 may specifically be prevented from receiving the second output and first output, respectively. For example, the first output may be encrypted by the central controller 400 using a public encryption key of the first computing device 200 and/or the second output may be encrypted by the central controller 400 using a public encryption key of the second computing device 300. In this manner, only the first computing device 200 (using its private encryption key) can decrypt the first output, and/or only the second computing device 300 (using its private encryption key) can decrypt the second output.

For example, following on again from the above, the first computing device 200 knows that the second cohort C2 comprises keys which satisfy both Q1 and Q2 (a first fragment of information), i.e. are members of segments S1 and S2, and the second computing device 300 knows that the data entries identified by keys kc and kd are members of cohort C2 (a second fragment of information). This allows the cohort ID (C2) to be used as a "go-between" for the first computing device 200 and second computing device 300 so that action can be taken based on the whole information, while each computing device 200, 300 understands only different fragments of information. The manner in which the cohorts are generated also prevents the segment definitions from being mapped to individual keys, thereby guaranteeing individual record privacy.

One caveat is that if a particular cohort comprises too few data entries (e.g. users, in the programmatic advertising example), it may be possible for a first computing device 200 to identify the user, which is not desirable. Hence, in examples there may be a minimum size for cohorts. On the other hand, larger cohort sizes reduces the granularity available in the system. Hence, in examples, there may be a maximum size for cohorts. Put generally, there may be an acceptable range for the number of data entries comprised in each cohort, between a minimum cohort size and a maximum cohort size, e.g. 900-1100 data entries. It is appreciated that this is a design choice. In other examples, the target cohort size may be determined based on the number of keys and a target number of cohorts, i.e. by dividing the number of keys by the target number of cohorts.

Generally, the manner in which the keys are grouped into cohorts based on the indicators is a design choice as there is a trade-off between many factors including e.g. privacy, accuracy, speed of computation. Several examples are described below.

In a first example of cohort generation, the indicators may first be decomposed into disjunct sets. A disjunct set comprises data entries which satisfy the same zero of more of the queries. Any disjunct sets having a size falling within the acceptable range may be removed first, and formed into cohorts in their own right.

Next, any disjunct sets having a size larger than the acceptable range may be split into two smaller sets, at least one of the sets having an acceptable size (which can then be removed and formed into a cohort). This may leave one or more sets of data entries having a size less than the acceptable range. These sets, along with any original disjunct sets which were already below the acceptable size range, can be combined to form cohorts having an acceptable size. Cohorts formed in this way, will not be "pure" cohorts comprising only data entries satisfying the same zero or more queries, and therefore may be of less value to the first entities 20.

In a second example, cohorts may be generated based on treating the indicators (e.g. 0-0-0, 0-0-1, etc.) as binary numbers and sorting them using a Gray code sort, i.e. to sort the keys such that their indicators are in ascending or descending Gray code order. Gray code (also known as reflected binary code) is an ordering of the binary numbers in which each successive pair of values differs by only one bit (i.e. one digit). Hence, sorting the indicators in such a manner naturally places similar indicators near one another. It is appreciated that other examples of suitable sorts exist, based on different reflected binary codes, such as Lucal code.

Figure 8:
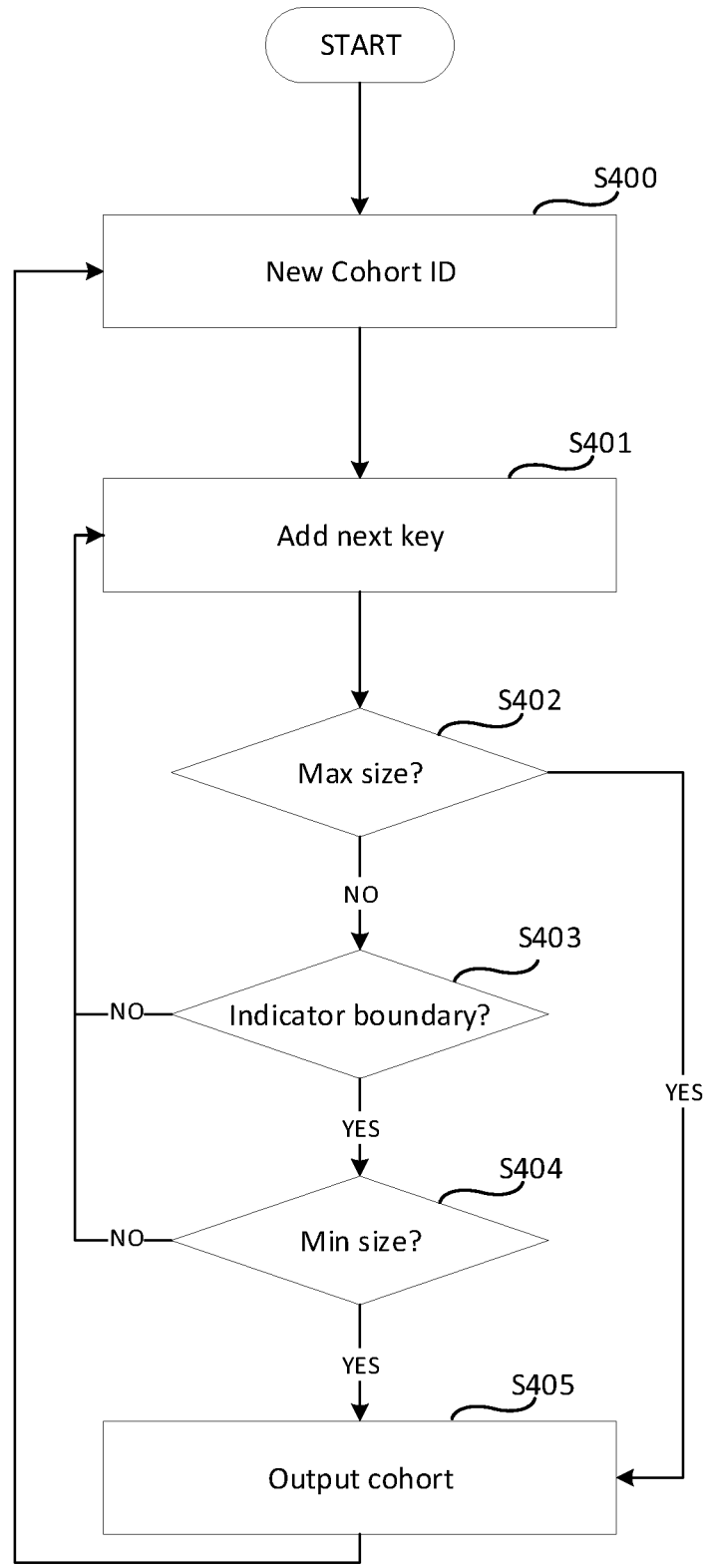
FIG. 8 shows schematically a flow diagram of cohort generation in accordance with examples described herein.

The cohort generation module 402 may then parse the sorted list entry-by-entry, adding each key to the same cohort until either an indicator boundary (i.e. a point where the indictor changes) or the maximum cohort size is reached. This is shown schematically in FIG. 8.

At S400 the cohort generation module 402 defines a new cohort ID. The method then proceeds to S401.

At S401 the cohort generation module 402 add the next key in the sorted list to the cohort currently being constructed (with the ID defined at S400). The method then proceeds to S402.

At S402, the cohort generation module 402 determines whether the size of the cohort has reached the maximum cohort size. If yes, the method proceeds to S405 and that cohort is output in its current state as a "final" or "complete" cohort. The method then reverts to S400 where a new cohort ID is defined). If no, the method proceeds to S403.

At S403, the cohort generation module 402 determines whether an indicator boundary has been reached. Specifically, the cohort generation module 402 determines whether or not the next key has a different indicator from the key just added at S401. If no, the method reverts to S401 and the next key is added to the cohort. If yes, the method proceeds to S404.

At S404, the cohort generation module 402 determines whether the minimum cohort size has been reached. Specifically, the cohort generation module 402 determines whether the number of keys present in the current cohort is equal to the minimum number of keys allowed in a cohort. If yes, the method proceeds to S405 and the cohort is output in its current state as a "final" or "complete" cohort. If no, the method reverts to S401 and the next key is added to the cohort.

A Gray code sorted list of keys is cyclic in that keys towards the end of the list also have similar indicators to those towards the beginning of the list. Hence, if there are a small number of keys left over after the application of the process of FIG. 8, these keys can be added to either the first cohort or the last cohort, or both, depending on the minimum and maximum size requirements.

In a third example, the cohort generation module 402 may also parse the sorted list entry-by-entry, but may apply a different process than that described above. In particular, instead of a minimum and maximum cohort size, the cohort generation module 402 may use a target cohort size, and an acceptable amount of variation either side (e.g. 5%, 10%, etc.). In such cases, as the cohort generation module 402 parses the sorted list, it may use look-ahead logic to determine when to finalise a cohort. For example, upon reaching the target cohort size, the cohort generation module 402 may look ahead to see where the next indicator boundary occurs. If it occurs within the acceptable amount of variation above the target cohort size, the cohort generation module 402 may determine the continue adding keys to the current cohort until the indicator boundary is reached.

One particularly useful application of techniques described herein is in programmatic advertising. Programmatic advertising refers to the automated or semi-automated buying and selling of advertisement space (aka "ad inventory") within a computer system. For example, advertisers (e.g. brands) may bid in real-time to have their advertisement presented to a user by a particular publisher (e.g. on a website). A 'bid' is made when an advertiser considers that the space that is available may be relevant to their target audience. In one prior system, when an advertisement space becomes available for a given user, the publisher broadcast a user ID for that user to the advertisers, and bidding is performed based on the user ID. That is, the advertisers determine based on the user ID whether or not that user is relevant to their target audience. Transmitting user IDs in this manner has obvious security and privacy concerns. These can be mitigated by transmitting the user IDs in an encrypted or hashed form, but still requires the publisher to disclose some information relating to their audience. In another prior system, the users at the publisher are grouped into segments based on queries defined by the advertisers. In these systems, when an advertisement space becomes available for a given user, the publisher broadcast not the user ID, but an indication of the segment(s) to which that user belongs. This avoids the security and privacy concerns of transmitting user IDs, but still requires the advertisers to disclose their segment definitions to the publisher.

Programmatic advertising uses software known as a Supply Side Platform (SSP) at the publisher-side, and software known as a Demand Side Platform (DSP) at the advertiser-side. A publisher uses an SSP to manage their ad inventories, and the advertisers uses a DSP to manage the bidding process. The SSP decides which ads to serve to the user, based on the bids received from the DSPs.

Typically, when an ad opportunity becomes available at the publisher, the SSP broadcasts the opportunity to the advertisers' DPSs who can then bid accordingly. As known in the art, this can be performed "live" in substantially real-time. For example, when a user navigates to a webpage owned by the publisher, the SSP may broadcast an opportunity indicating that a slot for displaying a visual ad is available. This can all be performed before the webpage is even loaded and presented to the user. As another example, when a user selects a video to watch, the SSP may broadcast an opportunity indicating that a slot for displaying a video ad is available.

Hence, it is appreciated that in examples the first entity 20 may be an advertiser and the second entity 30 may be a publisher. In such cases, the first controller 230 may comprise a DSP and the second controller 330 may comprise an SSP. The DSP 230 and SSP 330 together implement part of a programmatic advertising system. Specifically, the publisher 30 uses the SSP 330 to manage their ad inventories, and the advertiser 20 uses the DSP 230 to manage the bidding process.

Continuing the example described above, consider a user identified by key ke who navigates to a webpage owned by the publisher 30. In this case, the SSP 330 determines the corresponding cohort ID for key ke—cohort C3—and sends this cohort ID to the first computing devices 200. First computing device 200 is able to determine, based on the cohort ID, that the user must be a member of segments S1 and S3 (i.e. satisfies queries Q1 and Q3). The first computing device 200 is therefore enabled to bid accordingly, on the basis of the cohort ID alone, without knowing the identity of the user.

In examples, there may be a plurality of first computing devices 200, each providing a respective one or more queries to the central controller 400 to be used in the segment and cohort generation as described above. Specifically, the segment generation module 401 may generate a segment for each of the queries received from the plurality of first computing devices 200, and the cohort generation module 402 may generate cohorts based on all of these segments.

However, the output generation module 403 must generate different first outputs for each of the first computing devices 200. This is because it is important that the output (first output, generated as above) sent to each first computing device 200 only comprises query information for queries that that first computing device 200 provided (and not query information for queries provided by other first computing devices).

Figure 6:
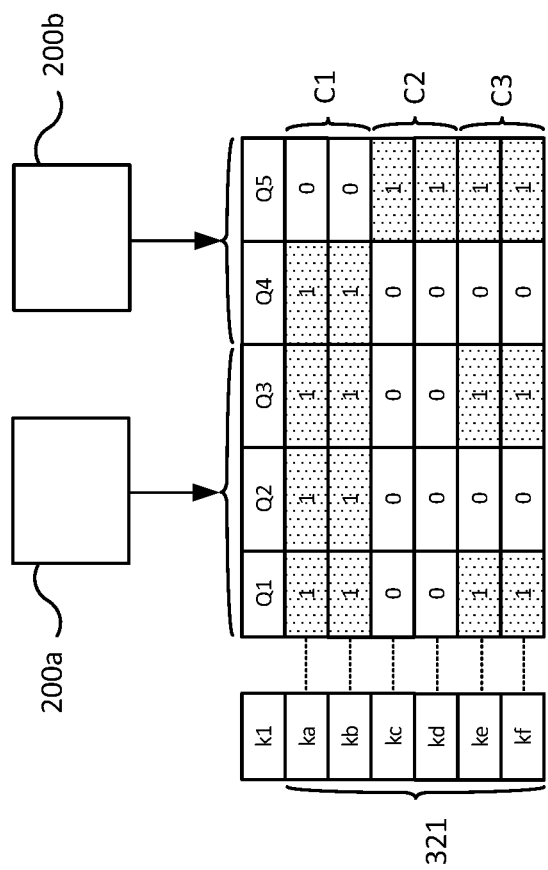
FIG. 6 shows schematically an example in which queries are received from a plurality of different computing devices.

An example is shown in FIG. 6, using just two first computing devices 200a, 200b, for ease of explanation. It is appreciated that the concept extends also to three or more first computing devices 200.

In this example, first computing device 200a is the first computing device from the earlier examples, which provides queries Q1-Q3. Additional first computing device 200b is an additional first computing device which provides two more queries: Q4 and Q5. The segment generation module 401 generates five corresponding segments S1-S5 in the manner described above, and the cohort generation module 402 uses these segments as the basis for generating a respective indicator for each key, also in the manner described above.

The resulting indicators are shown for the same example six keys ka-kf. Q1-Q3 were discussed above. Q4 is satisfied by ka and kb only (i.e. segment S4 comprises keys ka and kb), and Q5 is satisfied by kc, kd, ke and kf only (i.e. segment S5 comprises keys kc, kd, ke and kf). Hence, the keys may be grouped into three cohorts as follows (and shown in FIG. 6):

Cohort C1 comprises ka and kb, as they satisfy queries Q1, Q2, Q3 and Q4

Cohort C2 comprises kc and kd, as they satisfy query Q5; and

Cohort C3 comprises ke and kf, as they satisfy Q1, Q3 and Q5.

Different information is sent to first computing device 200a and additional first computing device 200b. Specifically:

First computing device 200a receives:
Cohort ID C1 and an indication that its members satisfy queries Q1, Q2, and Q3;
Cohort ID C2 and an indication that its members do not satisfy any of the queries;
Cohort ID C3 and an indication that its members satisfy queries Q1 and Q3; and First computing device 200b receives:
Cohort ID C1 and an indication that its members satisfy query Q4;
Cohort ID C2 and an indication that its members satisfy query Q5; and
Cohort ID C3 and an indication that its members satisfy query Q5.

Note that while each computing device receives the full list of cohort IDs, the segment information that each computing device sees for each cohort is different. Specifically, each computing device is only provided with segment information relating to its own queries (e.g. first computing device 200b is not provided with any information relating to queries Q1, Q2 or Q3, and first computing device 200a is not provided with any information relating to queries Q4 or Q5).

Figure 7:
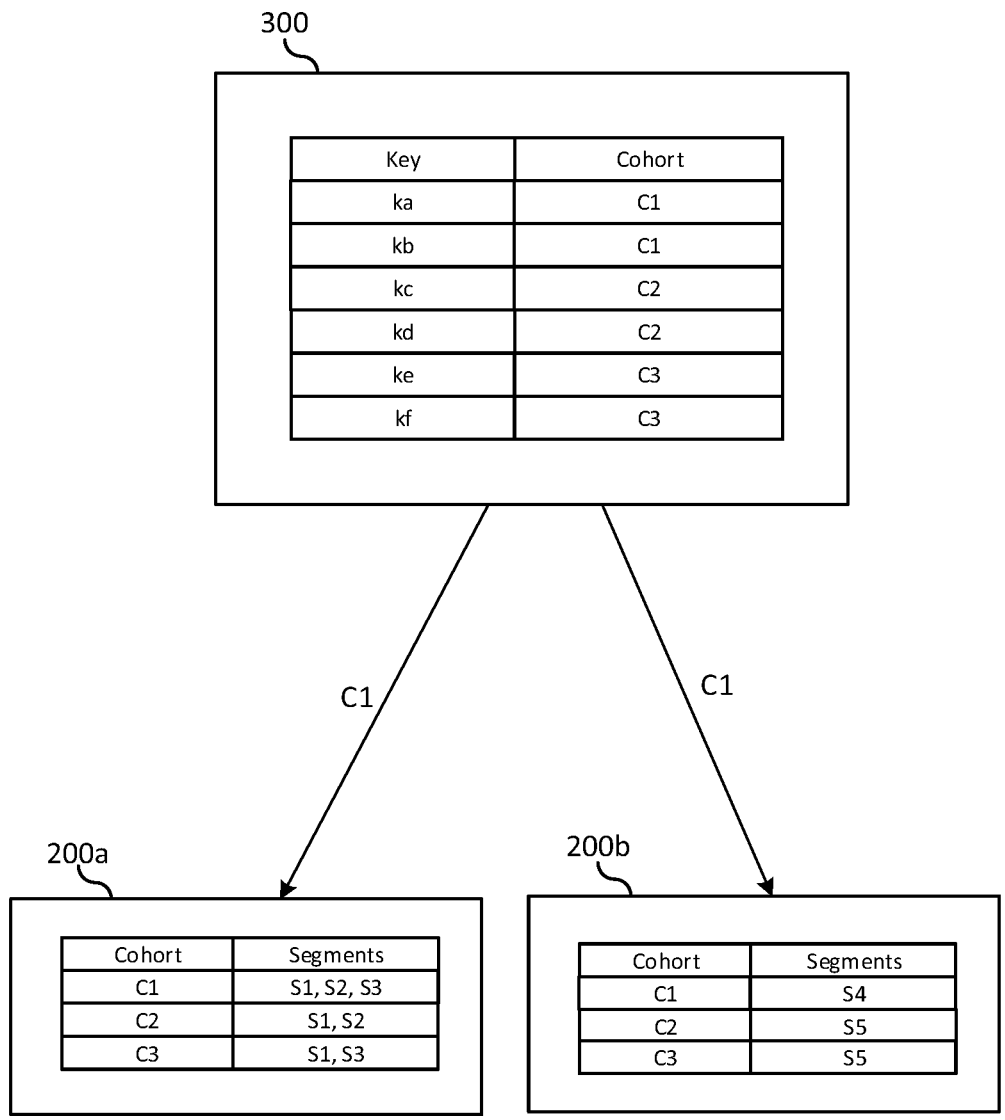
FIG. 7 shows schematically an example of the data structures held at different respective computing devices.

FIG. 7 illustrates, for this example, data structures which may be stored at each of the first computing devices 200a, 200b and second computing device 300. As also shown in FIG. 7, the second computing device 300 is able to broadcast a cohort ID to the first computing devices 200a, 200b. Each first computing device 200a, 200b can make its own evaluation of this broadcast cohort ID based on their own (different, in this case) knowledge regarding which segments are represented in that cohort, and act accordingly. As mentioned above, this is particularly useful in a programmatic advertising system. For example, if a user identified by key ka becomes available for advertising at the second computing device 300 (advertiser), the second computing device 300 is able to determine this user's cohort ID, C1, and broadcast this cohort ID to the first computing devices 200a, 200b. In this example, first computing device 200a can determine based on the cohort ID C1 that the user who is available for advertising is a member of segments S1, S2, and S3, and first computing device 200b can determine based on the cohort ID C1 that the user who is available for advertising is a member of segment S4. This is sufficient information for the first computing device 200a, 200b to enter bidding for the advertisement to that user, without either first computing device 200a, 200b receiving any personal information identifying the user.

In examples, the central controller 400 may comprise a query buffer for storing queries received from the one or more first computing devices 200. In such cases, the segment generation module 401 may operate on queries as stored in the query buffer. This allows the cohort generation process to be performed at any time. In an example, the cohort generation may be performed in response to input received from the second computing device 300 (e.g. upon request by the second entity 20). In another example, the cohorts may be generated periodically (e.g. every 24 hours, once a week, etc.), e.g. using one or more queries present in the query buffer at that time. In another example, the cohorts may be generated in response to receiving one or more new queries from one or more of the first computing devices (e.g. when a new query is added to the query buffer). Once generated, the new cohort information may be transmitted to the various computer systems as described above.

In the above, only a single key type has been considered at the dataset 320. In examples, however, it is possible that the dataset 320 holds data entries in association with two or more keys of different types. Similarly, a supporting dataset 520 used to define part of the query (e.g. a set operation defining an intent of the query) may also hold data entries in association with two or more keys of different types. Each of the dataset 320 and the supporting dataset 520 may optionally hold attribute information. This gives rise to a number of possibilities which will now be explained using the example datasets shown below.

For ease of explanation, in these examples, the key types are assumed to be the same between the dataset 320 and the supporting dataset 520. However, this is not necessarily true in all cases. If one or more of the key types are different, then one or more "via" datasets may be used in the manner described above to provide a mapping between key types. Additionally, the keys in this example are assumed to be single-valued keys, although in other examples any one or more of these keys may be a multi-valued key (i.e. a key having multiple values, any of which may be matched against).

Table 6 shows an example of dataset 320 hold keys of a first key type (key1—names in this example) and keys of a second key type (key2—emails in this example). The dataset 320 also holds attribute information (ages in this example), but this is optional.

TABLE 6

Dataset 320

| Key1 (name) | Key2 (email) | Attribute (age) |
|---|---|---|
| A | a@email.com | 24 |
| B | b@email.com | 53 |
| C | c@email.corn | 28 |
| D | d@email.com | 40 |
| E | e@email.com | 36 |
| F | f@email.com | 53 |

Table 7 shows an example of supporting dataset 520 holding keys of a first key type (key1—names in this example) and keys of a second key type (key2—emails in this example). The supporting dataset 520 also holds attribute information (heights in this example), but this is optional.

TABLE 7

Supporting Dataset 520

| Key1 (name) | Key2 (email) | Attribute (height) |
|---|---|---|
| A | a@email.com | 167 |
| B | b@email.com | 175 |
| C | c@email.com | 176 |
| D | d@email.com | 182 |

The one or more keys specified in the query to be used as the basis for performing a set operation on the dataset 320 and the supporting dataset 520 may be referred to as "match keys". The one or more queries used to define segment membership by the segment generation module 401 may be referred to as "output keys". The output keys do not have to be the same as the match keys.

In a first example, Key1 may be used as a match key to determine an intersection between the dataset 320 and the supporting dataset 520 (which would result in the intersection "A, B, C, D", in the tables above). Key2 may then be used as an output key to define the segment membership (which in this case would be "a@email.com, b@email.com, c@email.com, d@email.com"). The cohort membership information may be delivered to the second computing device 300 using the output key Key2, i.e. a cohort ID is associated with a set of keys of the second type (Key2) defining membership of that cohort.

In a second example, Key1 may be used as a match key to determine an intersection between the dataset 320 and the supporting dataset 520 (which would result in the intersection "A, B, C, D", in the tables above). Both Key1 and Key2 may be used as output keys to define the segment membership. The cohort membership information may be delivered to the second computing device 300 using the both output keys Key1 and Key2, i.e. a cohort ID is associated with a set of keys of the first type (Key1) and the second type (Key2). The second computing device 300 in this case can determine which cohort a particular key is a member of using either key type.

In a third example, both Key1 and Key2 may be used as match keys. For example, the segment generation module 401 may generate one or more segments using Key1 and one or more additional segments using Key2. As above, either one or both of Key1 or Key2 may be used as the output key(s) to define segment membership, and the cohorts defined accordingly.

In the above examples referring to Table 6 and Table 7, the sets of Key1 and Key2 were complete in the sense that every data entry held a value for both Key1 and Key2, but this is not always necessarily the case. That is, in some example, some or all data entries may be identified by only a key of a first type (e.g. name), or only a key of a second type (e.g. email address). Similar considerations apply to three or more key types. In such cases, a given query can be run on such a dataset 320 with respect to each key separately, and then the results combined (e.g. using a union operation) to form the final segment for that query.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to storage for storing data. This may be provided by a single device or by plural devices. Suitable devices include for example a hard disk and non-volatile semiconductor memory (including for example a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of controlling access to sensitive data stored in a computer system, the method comprising:
receiving at a central controller a plurality of queries from at least one first computing device, each query indicating one or more conditions;
accessing a dataset comprising a plurality of data entries each identified by a respective one or more keys;
generating for at least some of the data entries in the dataset, a respective indicator of which zero or more of the conditions of the plurality of queries are satisfied by that respective data entry, a data entry satisfying zero conditions being a data entry that does not satisfy any of the conditions;
storing in computer memory an indication of keys identifying the data entries grouped into one or more cohorts based on the indicators, each cohort stored in association with a respective cohort identifier, at least some of the cohorts comprising keys identifying data entries satisfying the same zero or more of said conditions;
generating a first output comprising an identifier of a first cohort and an indication of at least one of said plurality of conditions which is satisfied by data entries identified by keys in the first cohort;
transmitting the first output to the first computing device;
generating a second output comprising an identifier of the first cohort and a set of keys corresponding to the data entries in the first cohort; and
transmitting the second output to a second computing device, the second computing device separate from the first computing device.

2. The method according to claim 1, wherein the first output is not transmitted to the second computing device and/or the second output is not transmitted to the first computing device.

3. The method according to claim 1, wherein storing keys identifying the data entries grouped into one or more cohorts comprises assigning every key in the dataset a cohort identifier.

4. The method according to claim 1, wherein the first and second computing devices are owned by different entities.

5. The method according to claim 1, wherein the plurality of queries are received from two or more different first computing devices, and wherein a respective first output is generated for each first computing device, the indication in each respective first output relating only to conditions of queries received from that respective first computing device.

6. The method according to claim 1, comprising partitioning the data entries into disjunct sets, each disjunct set comprising data entries which satisfy the same zero or more of said plurality of conditions; and
wherein storing keys identifying the data entries grouped into one or more cohorts comprises splitting a disjunct set comprising more than a threshold number of keys into two or more cohorts.

7. The method according to claim 1, comprising partitioning the data entries into disjunct sets, each disjunct set comprising data entries which satisfy the same zero or more of said plurality of conditions; and
wherein storing keys identifying the data entries grouped into one or more cohorts comprises combining a disjunct set comprising fewer than a threshold number of keys with another of the disjunct sets.

8. The method according to claim 1, wherein generating for each data entry in the dataset, the indicator of which zero or more of the conditions of the plurality of queries are satisfied by that data entry comprises accessing an additional dataset storing associations between keys of the first type and keys of the second type.

9. The method according to claim 1, wherein generating for each data entry in the dataset, the indicator of which zero or more of the conditions of the plurality of queries are satisfied by that data entry comprises accessing an additional dataset storing attribute information for data entries of the dataset.

10. The method according to claim 1, wherein said generating and storing of the data entries grouped into at least one cohort are performed periodically.

11. The method according to claim 1, wherein said generating and storing of the data entries grouped into at least one cohort are performed in response to receiving one or more new queries from one or more of the first computing devices.

12. The method according to claim 1, wherein said generating and storing of the data entries grouped into at least one cohort are performed in response to input received from the second computing device.

13. The method according to claim 1, comprising discarding one or more of the queries, and wherein said generating of the indicators is performed based on remaining queries following said discarding.

14. The method according to claim 1, comprising generating for each query a respective segment comprising any of said keys which satisfy that query; storing the segments in computer memory; and wherein said generating of the indicators comprises accessing the stored segments.

15. The method according to claim 14, wherein the segments are stored in computer memory as respective binary structures, the binary structure for a given segment being generated by encoding keys comprised in that segment.

16. The method according to claim 14, wherein the segments are stored in computer memory as a list of keys annotated with segment identifiers.

17. The method according to claim 1, wherein storing keys identifying the data entries grouped into one or more cohorts comprises sorting the keys based on their respective identifiers and generating cohorts based on the sorted keys.

18. The method according to claim 1, comprising adding to at least one cohort at least one key having an indicator different from those of other keys in that cohort.

19. A computing device for controlling access to sensitive data stored in a computer system, the computing device comprising:
 a computer memory;
 an interface for receiving a plurality of queries from at least one first computing device, each query indicating one or more conditions;
 a cohort generation module configured to:
  access a dataset comprising a plurality of data entries each identified by one or more respective keys;
  generate, for at least some of the data entries in the dataset, a respective indicator of which zero or more of the conditions of the plurality of queries received via the input are satisfied by that respective data entry, a data entry satisfying zero conditions being a data entry that does not satisfy any of the conditions; and
  store in the computer memory an indication of keys identifying the data entries grouped into one or more cohorts based on the indicators, each cohort stored in association with a respective cohort identifier, at least some of the cohorts comprising keys identifying data entries satisfying the same zero or more of said conditions; and
 an output generation module configured to:
  generate a first output comprising an identifier of a first cohort and an indication of at least one of said plurality of conditions which is satisfied by data entries identified by keys in the first cohort;
  transmit the first output to the first computing device;
  generate a second output comprising an identifier of the first cohort and a set of keys corresponding to the data entries in the first cohort; and
  transmit the second output to a second computing device, the second computing device separate from the first computing device.

* * * * *